Figure 1:
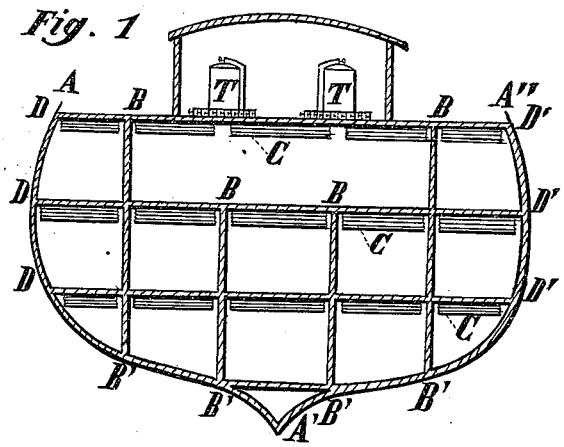

No. 644,480. Patented Feb. 27, 1900.
F. L. DE VILLA.
DEVICE FOR PREVENTING SHIPS FROM SINKING.
(Application filed Nov. 25, 1898.)

(No Model.) 6 Sheets—Sheet 1.

Witnesses:

Inventor:
F. L. de Villa.

No. 644,480. Patented Feb. 27, 1900.
F. L. DE VILLA.
DEVICE FOR PREVENTING SHIPS FROM SINKING.
(Application filed Nov. 25, 1898.)
(No Model.) 6 Sheets—Sheet 2.

Witnesses: Inventor:

No. 644,480. Patented Feb. 27, 1900.
F. L. DE VILLA.
DEVICE FOR PREVENTING SHIPS FROM SINKING.
(Application filed Nov. 25, 1898.)
(No Model.) 6 Sheets—Sheet 3.

Witnesses:
Ricardo Vazquez
Alejandro Chabot

Inventor:
F. L. de Villa

No. 644,480. Patented Feb. 27, 1900.
F. L. DE VILLA.
DEVICE FOR PREVENTING SHIPS FROM SINKING.
(Application filed Nov. 25, 1898.)
(No Model.) 6 Sheets—Sheet 4.

Witnesses: Inventor:

No. 644,480. Patented Feb. 27, 1900.
F. L. DE VILLA.
DEVICE FOR PREVENTING SHIPS FROM SINKING.
(Application filed Nov. 25, 1898.)
(No Model.) 6 Sheets—Sheet 5.
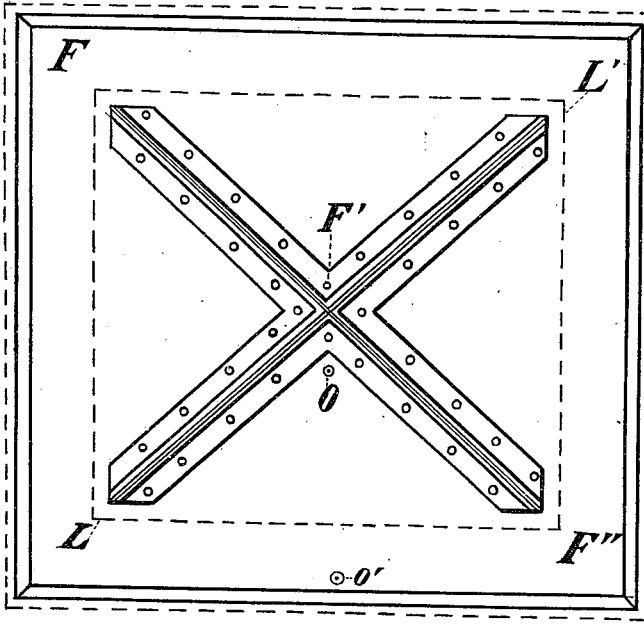
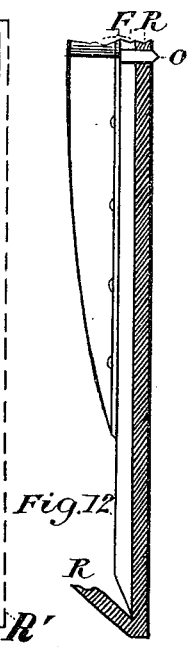
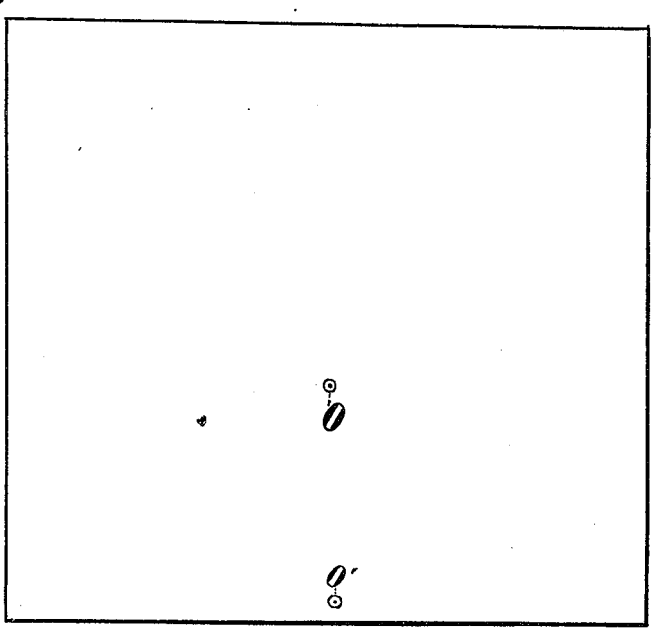
Witnesses: Inventor:

No. 644,480. Patented Feb. 27, 1900.
F. L. DE VILLA.
DEVICE FOR PREVENTING SHIPS FROM SINKING.
(Application filed Nov. 25, 1898.)
(No Model.) 6 Sheets—Sheet 6.
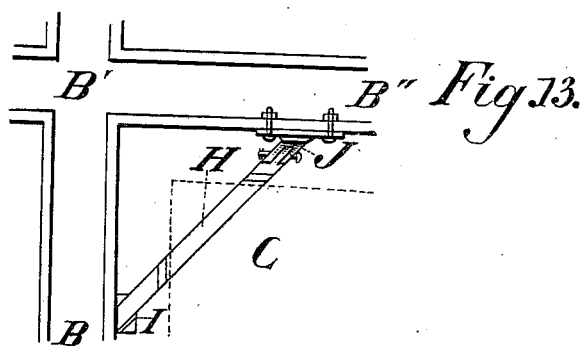
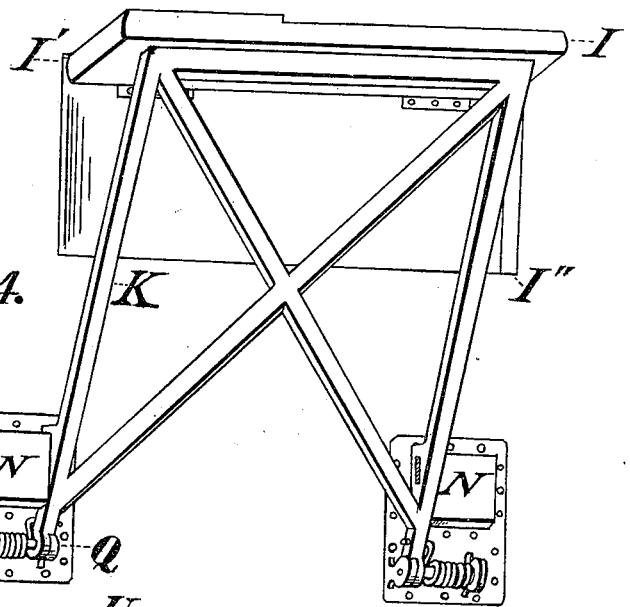
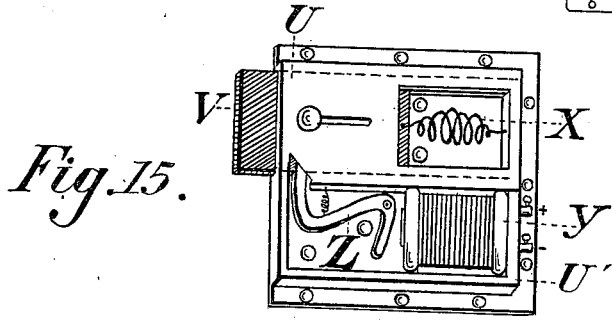
Witnesses:
Inventor:
F. L. de Villa.

UNITED STATES PATENT OFFICE.

FRANCISCO L. DE VILLA, OF GUATEMALA, GUATEMALA.

DEVICE FOR PREVENTING SHIPS FROM SINKING.

SPECIFICATION forming part of Letters Patent No. 644,480, dated February 27, 1900.

Application filed November 25, 1898. Serial No. 697,484. (No model.)

*To all whom it may concern:*

Be it known that I, FRANCISCO LUIS DE VILLA, M. D., a citizen of the Republic of Colombia, residing at Guatemala, in the Republic of Guatemala, have invented a new and useful device to prevent ships and vessels of all kinds from filling up with water and sinking, to be known hereinafter as the "folding pneumatic compartments," of which the following is a specification.

My invention consists of a series of airtight cuboidal rubber compartments distributed throughout the vessel, the accordion-like structure of which allows of their folding up and which when brought into action are distended with air kept compressed (even to liquefaction) in suitable metal receptacles. When not in use, they are closely folded against the under surface of the decks to which they are attached and kept in this position to a certain extent by atmospheric pressure on account of the partial vacuum existing in their interiors, but principally by electromechanical means, the sudden removal of which insures their instantaneous release necessary for distention at a given moment. The compressed-air receptacles are guarded by stop-cocks provided with meters and connected with the compartments by a system of metal pipes. The moment a dangerous leak is sprung the stop-cock guarding the compressed-air receptacle is opened and the required amount of air is allowed to rush into and distend the compartments. Once fully distended, by occupying the greater part of the space on board available for water to flow into, the compartments prevent the ingress of the same in sufficient quantity to sink the ship, and enough buoyancy is thereby communicated to the vessel to keep her afloat indefinitely. When the compartments have accomplished their object, they are emptied, after closing their connection with the compressed-air receptacles, by opening their outlets and are folded back in their places. A great deal of space is gained on board by the employment of folding compartments, they being, moreover, less exposed to injury than metal ones.

Figure 2:
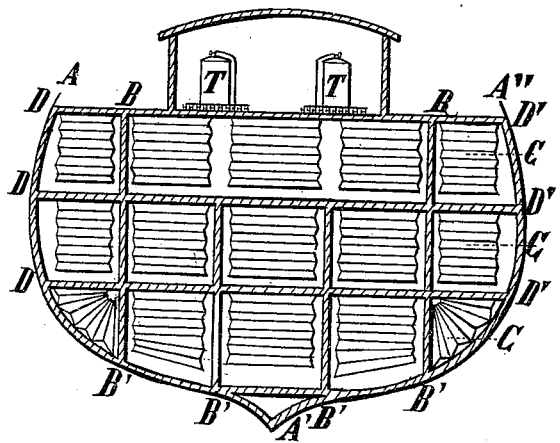
Figure 3:
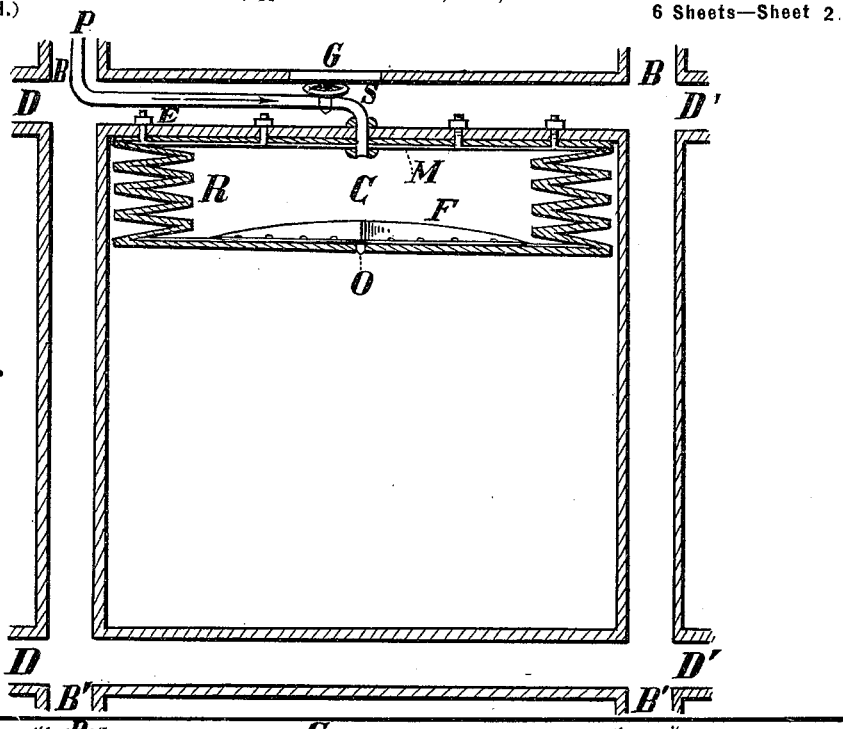
Figure 4:
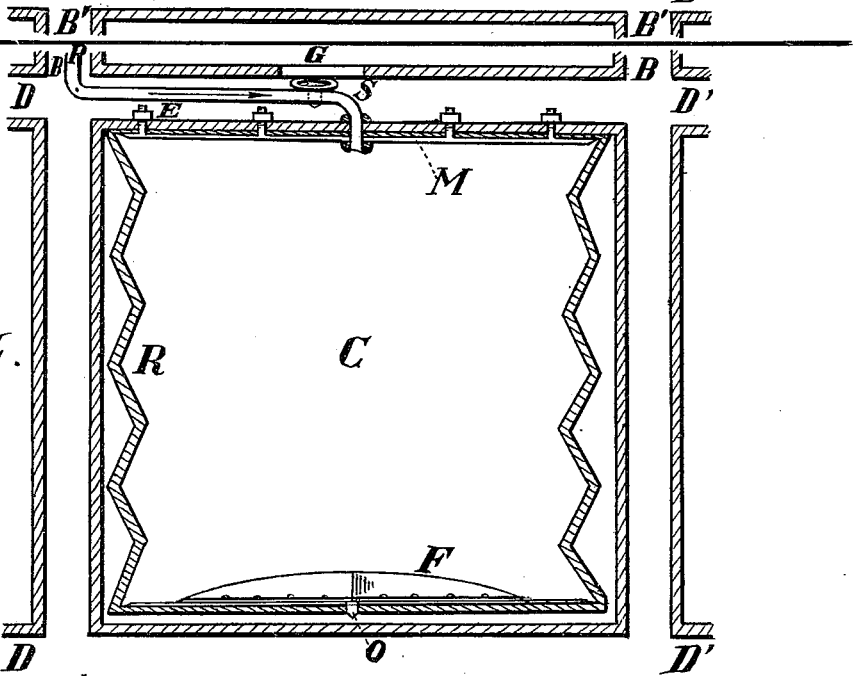
Figure 5:
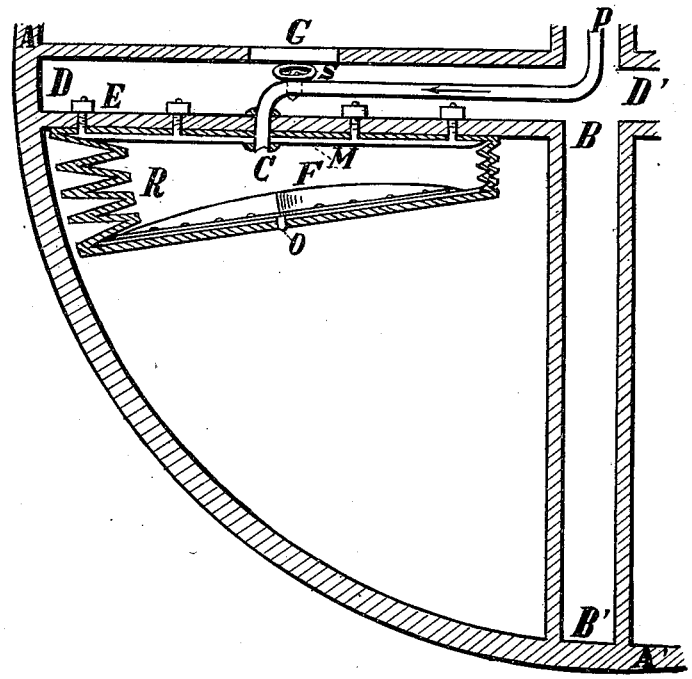
Figure 6:
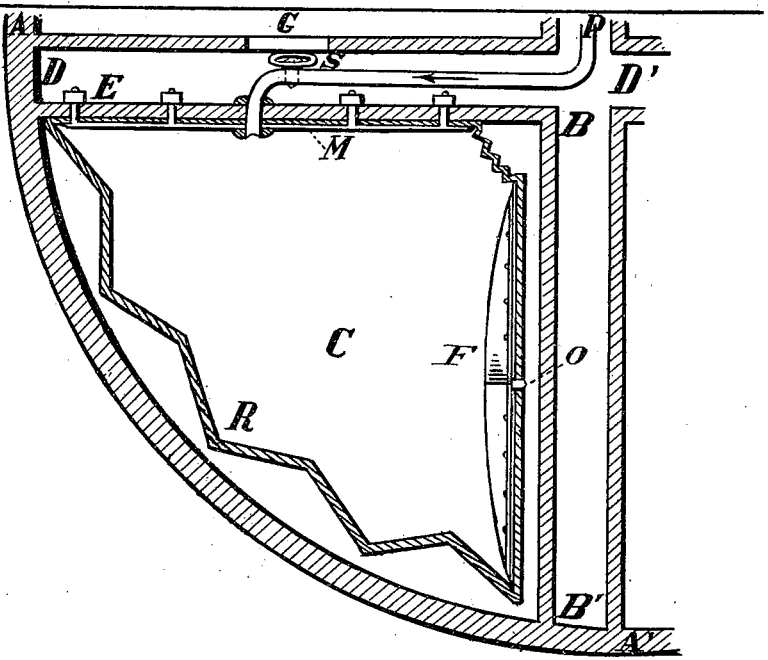
Figure 7:
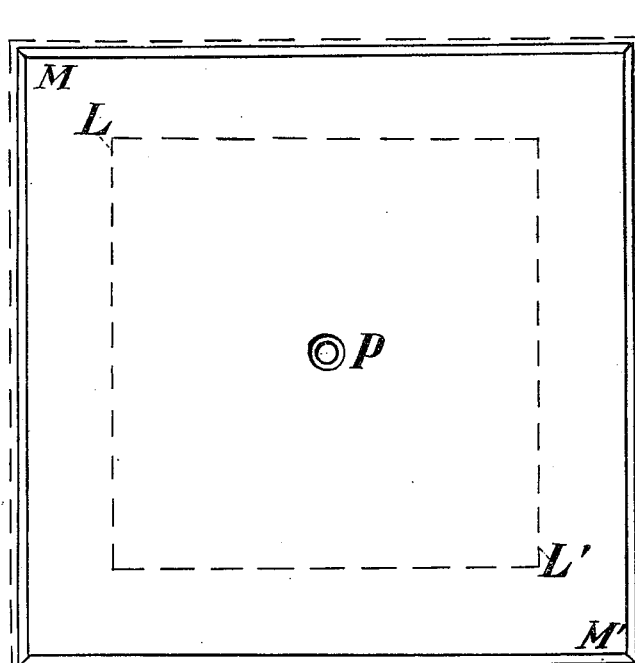
Figure 9:
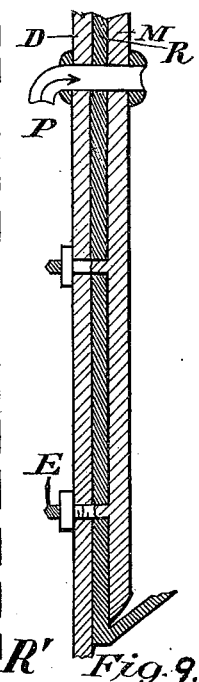
Figure 8:
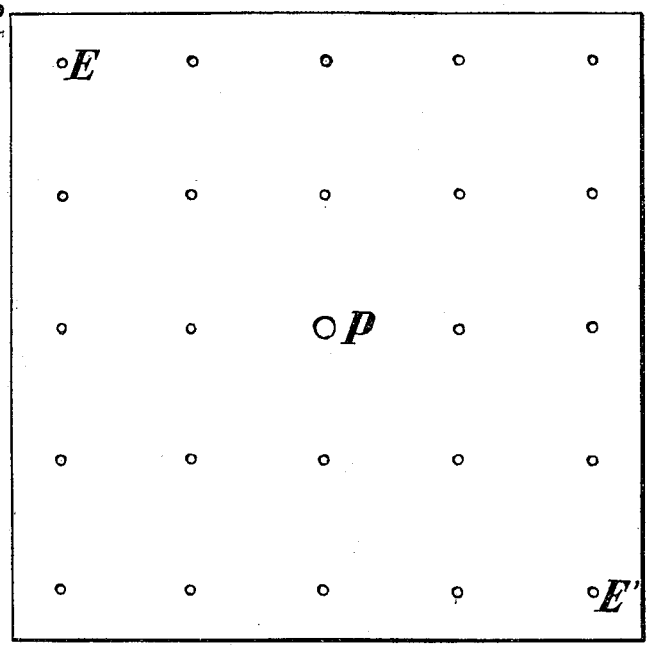

Figure 1 represents a vertical transverse section amidships of a vessel provided with folding pneumatic compartments, showing said compartments folded. Fig. 2 is a similar view showing the compartments expanded. Fig. 3 represents a vertical section at right angles to the longitudinal axis of the vessel through the center of a pneumatic compartment almost completely folded occupying a six-sided space. Fig. 4 is a similar view showing the compartment distended. Fig. 5 represents a vertical transverse section through the center of a folded compartment occupying a semiprismatic space on board. Fig. 6 is a similar view showing the compartment distended. Fig. 7 shows the under aspect of upper wall of a compartment. Fig. 8 shows upper aspect of same structure. Fig. 9 is a vertical section through the center of the upper wall of a compartment. Fig. 10 represents the upper aspect of the bottom of a compartment. Fig. 11 shows the under aspect of the bottom of a compartment. Fig. 12 is a vertical section through the center of the bottom of a compartment. Fig. 13 represents the upper aspect of the disappearing supports. Fig. 14 is a slightly-oblique lateral view of the disappearing platform and bracket support. Fig. 15 shows the construction of the electromagnetic spring-latch.

The folding compartments are placed throughout the ship in whichever of the cuboidal and semiprismatic spaces formed between the hull proper, A A, the bulkheads B B', and the decks D D', Fig. 1. There is or is apt to be at times available room for them in their distended condition. The compressed-air receptacles T (shown in Figs. 1 and 2) are placed in a deck-house, where they are readily accessible at any time. The outlet at their upper part is guarded by a stop-cock and a meter and is connected, by means of a metal pipe which curves downward, with the horizontal main pipe, from which spring the special distributing-pipes for each compartment, all likewise guarded at their commencement by stop-cocks.

The special pipes P come down in the thickness of the bulkheads B B' and decks D D', Figs. 3 and 4, and are provided with another stop-cock just before they enter the compartment for the purpose of shutting it off without being obliged to go all the way to the main pipe to do it. This stop-cock is accessible for manipulation through the small panel-door G, built in the upper layer of the deck D D'. On entering a compartment the pipes penetrate the lower layer of the deck D D' and the upper wall of the compartment C. The compartment C is a hollow cube composed of six walls made of rubber having a hempen tissue woven in its substance. The four lateral walls are made to fold accordion-like, as is shown at R. The upper wall is supported on its under surface by a metal plate M, which contributes to secure the compartment to the deck above. The rubber bottom is also provided with a square metal plate and semilunar trestle-frame F to keep it tense and give it rigidity. O is the outlet-valve perforating the bottom near the center.

In semiprismatic spaces, one side of which is formed by the concave bulwark, as is shown in Figs. 5 and 6, the compartments have exactly the same construction as in cuboidal ones, except that the folds of the side nearest the bulwark are made larger than those on the opposite side, producing thereby a fan-like spread or distention and enabling the compartment to adapt itself to the peculiar shape of the space, the bottom in this case rotating ninety degrees and approaching the bulkhead B B', as is shown in Fig. 6. No compartment should entirely fill up the space assigned to it in places where it would be apt to obstruct the egress of people. A sufficient amount of space should then exist between the compartment and the bulwark or bulkhead to allow one person at a time to pass out easily.

The top metal plate, Fig. 7, represented by the square in parallel lines M M', coincides in size and shape with the square rubber top. The junction of the rubber top and first fold of the lateral walls is represented by the dotted square R R', the square L L' indicating the inner and lower limit of the uppermost fold and its junction with the second. The parallel lines forming the square M M' represent the borders of the metal plate, beveled at the expense of the under surface to allow the lateral walls to fold up closer. P shows the entrance of the air-pipe and its shoulder-ring. The upper surface of the rubber top (shown by the square R R', Fig. 8) has a circular orifice in the center P for the entrance of the air-pipe and several rows of small circular apertures E E' for the passage of the attaching screw-bolts connected with the top plate.

The detailed construction and relative position of the structures forming the roof of a compartment when attached to the deck above are shown in Fig. 9. D represents the under layer of the deck; R, shaded in parallel lines, the rubber top and beginning of the first lateral fold; M, the metal top plate, with beveled edges, fitting accurately into the angle formed by the junction of the rubber top and the first fold of the lateral wall. Firmly adherent to this plate and projecting upward from it are seen the screw-bolts E, which after passing through the rubber top and under layer of the deck are capped on the other side by broad nuts, thus attaching the compartment firmly to the deck. The conduit-pipe perforates the three above-mentioned structures and on either side of them is firmly fixed by means of a shoulder-ring.

The bottom metal plate (represented in Fig. 10 by the square in parallel lines F F' F'') coincides in size and shape with the square rubber bottom and serves to keep the latter tense and flat. The junction of the lower fold and the rubber bottom is represented by the dotted square R R', the square L L' indicating the inner and upper limit of the lower fold and its junction with the next fold above. The parallel lines forming the square F F' F'' represent the metal plate, the borders of which are beveled at the expense of the upper surface to allow the lateral walls to fold up closer. The cross-shaped structure in the center is the trestle-frame, riveted through its flat shoulder to the upper surface of the plate, to which it gives rigidity, thereby keeping it from sagging down in the center. Near one of its angles, and also near the adjacent border of the plate, are seen the outlet screw-valves O O.'

The under aspect of the bottom of a compartment is shown in Fig. 11 by the square R R', O O' indicating the outlets.

The relative positions of the structures forming the bottom of a compartment are shown in Fig. 12. F represents the metal plate and trestle-frame, its beveled edge fitting accurately into the angle formed at the junction of the lower fold and the rubber bottom; R, the rubber bottom and part of the lower fold; O, the outlet near the center. The metal plates are firmly cemented throughout their whole extent to the rubber wall which they support in order to make the comparment absolutely air-tight.

The disappearing supports employed for the purpose of keeping the compartments steady and as close against the ceilings as possible are metal bars H, Fig. 13, placed diagonally across the corners formed by the junction of the bulkheads and the bulwarks. They are riveted to the bulkhead or bulwark by one extremity, which is provided with an axle-joint J. The bar is made flat from above downward, except at the stationary extremity, and has on its upper surface two cuboidal projections parallel to the sides forming the compartment-bottom, (shown in dotted outline,) which rests upon the bar. Their object is to keep the compartment steady. The free end of the bar rests upon the quadrilateral disappearing platform I. The small triangular portion of the upper surface of this platform upon which the bar does not rest is slightly and abruptly raised from the rest of said surface and at right angles to it for the purpose of further steadying the diagonal bar. This platform I, Fig. 14, is secured by means of hinges to the bulkhead, where a quadrilateral berth I' I'' is cut out for its reception, when it folds down and is supported by the disappearing-bracket frame K. This frame is attached by its two lower extremities to two brass plates riveted to the bulkhead by means of a spring-joint Q. The tendency of this spring is to pull the bracket downward, which leaves the platform unsupported, but is prevented from doing so by the bolt of the electromagnetic spring-latch N, which when acting passes through an aperture in the triangular projection existing on the inner aspect of the bracket-bars at their lower extremities. The electromagnetic spring-latch, Fig. 15, is constructed as follows: A square brass frame U U', which is continuous with or attached to the brass plate of the joint Q, Fig. 14, serves to support the whole. This frame has at one corner a sheath in which runs horizontally the bolt V, which when acting locks and retains the bracket in supporting position. The bolt is provided with a knob, which projects through and runs in a slit cut in the sheath and is used as a handle in shifting it. X is a spring which tends continually to draw the bolt back into the lock, and consequently out of the aperture in the bracket-bar. This is prevented ordinarily by the steel spring-hammer Z, the angular extremity of which in its usual position maintained by the small traction-spring, which connects it with the frame, fits into an angular groove cut into the bolt and its sheath. Out of this groove the hammer is drawn when its other limb is attracted by the electromagnet Y. The attachments for the wires leading the current into the coil are shown on the frame near Y marked + −. They end in a series of contact-buttons, one for each compartment, placed near the compressed-air cylinders. In those corners formed by a bulkhead and a bulwark when the curvature of the bulwark is small the fixed extremity of the disappearing bars is attached to the bulwark and not to the bulkhead, in order that the downward rotation of the free end of the bar when released may take place unobstructed by the incurving bulwark.

The disappearing supports work as follows: The corresponding contact-button is pushed, and an electric current from a battery passes through the coil Y, Fig. 15. The soft-iron core in its interior is thereby converted into a temporary magnet, which consequently attracts the free arm of the steel spring-hammer Z. The hammer swings on its pivot until it comes in contact with the core, and its other extremity is necessarily withdrawn from the groove cut in the bolt V. This bolt being now released is drawn in by the traction-spring X, and consequently releases the bracket K, which snaps down, pulled by the spring at the joint Q. The platform I, now left unsupported, folds down, swinging on its hinges through its own weight and that of the bar and compartment combined and goes into its berth in the bulwark. The bar itself now lacking support at its free end falls from the horizontal to the vertical position, swinging around the axis of the joint J. This sudden collapse of the diagonal bars from under the four corners of the compartment leaves it unsupported. It descends, however, only moderately, owing to the partial vacuum existing in its interior, but is now ready for expansion.

To readjust the collapsed supports after emptying and replacing the compartments, the successive structures are brought back in inverse order into supporting position.

I claim as my invention and desire to secure by Letters Patent of the United States—

1. The combination with spaces, or chambers, in a ship's hull, of the foldable expansible air-compartments, composed of a rigid top plate which is bolted to the ceiling of said chambers, a braced bottom plate, and accordion-like sides connecting such top and bottom portions in such manner as to exclude air and water, and means for forcing air into said compartments, as shown and described.

2. The combination, with spaces or chambers in a ship's hull, of foldable expansible air-compartments which are permanently secured to the ceilings of said chambers, and provided with a rigid bottom, of bars hinged at one end below the ceiling and adapted to engage a wall-support at the other end, as shown and described, whereby said bars extend horizontally beneath the compartments, to support them when collapsed, and are adapted to be readily dropped to release said compartments, as shown and described.

3. The combination, with spaces or chambers in a ship's hull, of foldable, expansible compartments which are permanently secured to the ceilings thereof, bars hinged to side walls of said chambers for upholding said compartments, shelves I hinged to opposite walls, and adapted, when in horizontal position, to support the free ends of said bars, hinged brackets or braces K adapted to engage and support the shelves, and means for locking and releasing the said brackets when it is desired to allow the shelves and bars to fall, and thus permit expansion of the air-compartments, as shown and described.

F. L. DE VILLA.

Witnesses:
RICARDO VÁSQUEZ,
ALEJANDRO ARDILAK.